Nov. 28, 1967   H. A. STORCH   3,355,200
FASTENER ASSEMBLY FOR ANGULAR JOINT
Filed Nov. 15, 1965   4 Sheets-Sheet 4
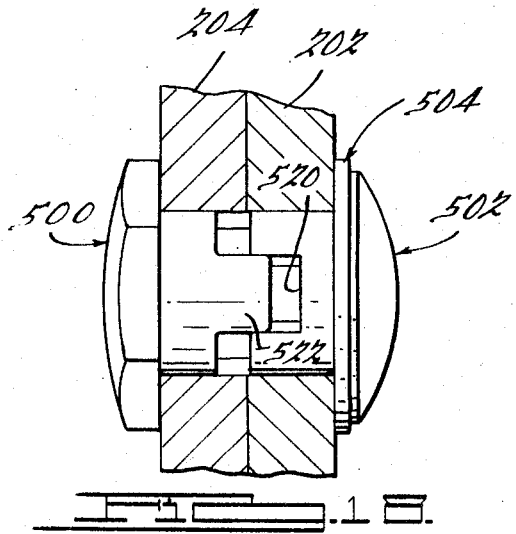
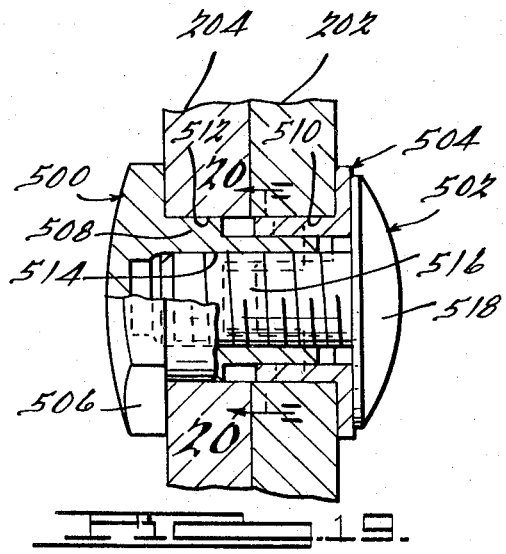
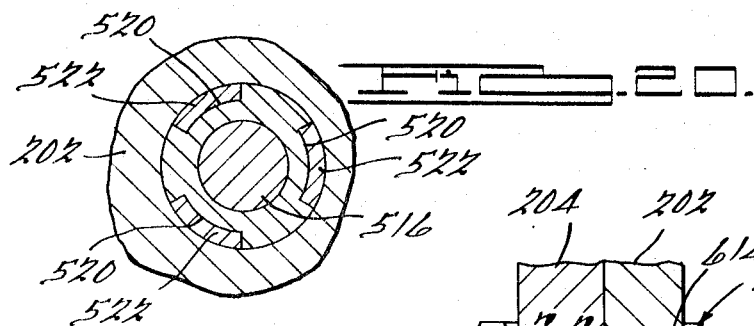
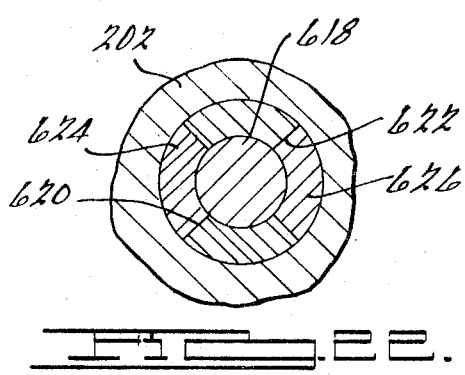
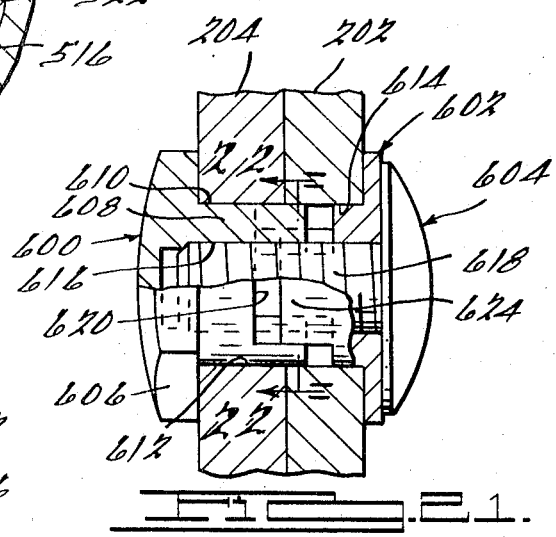
INVENTOR.
Harold A. Storch
BY
Carness Dickey Pierce
ATTORNEYS.

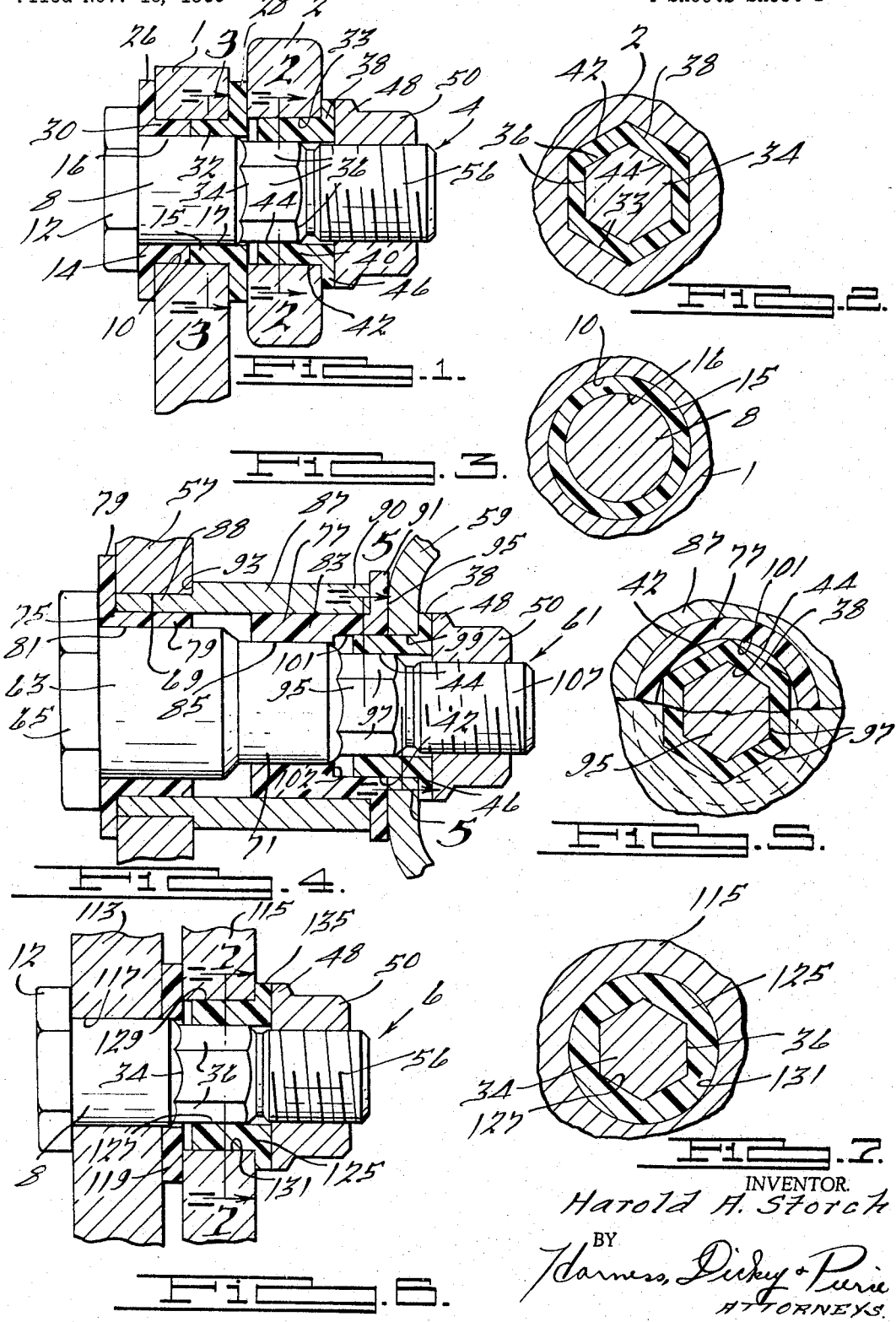

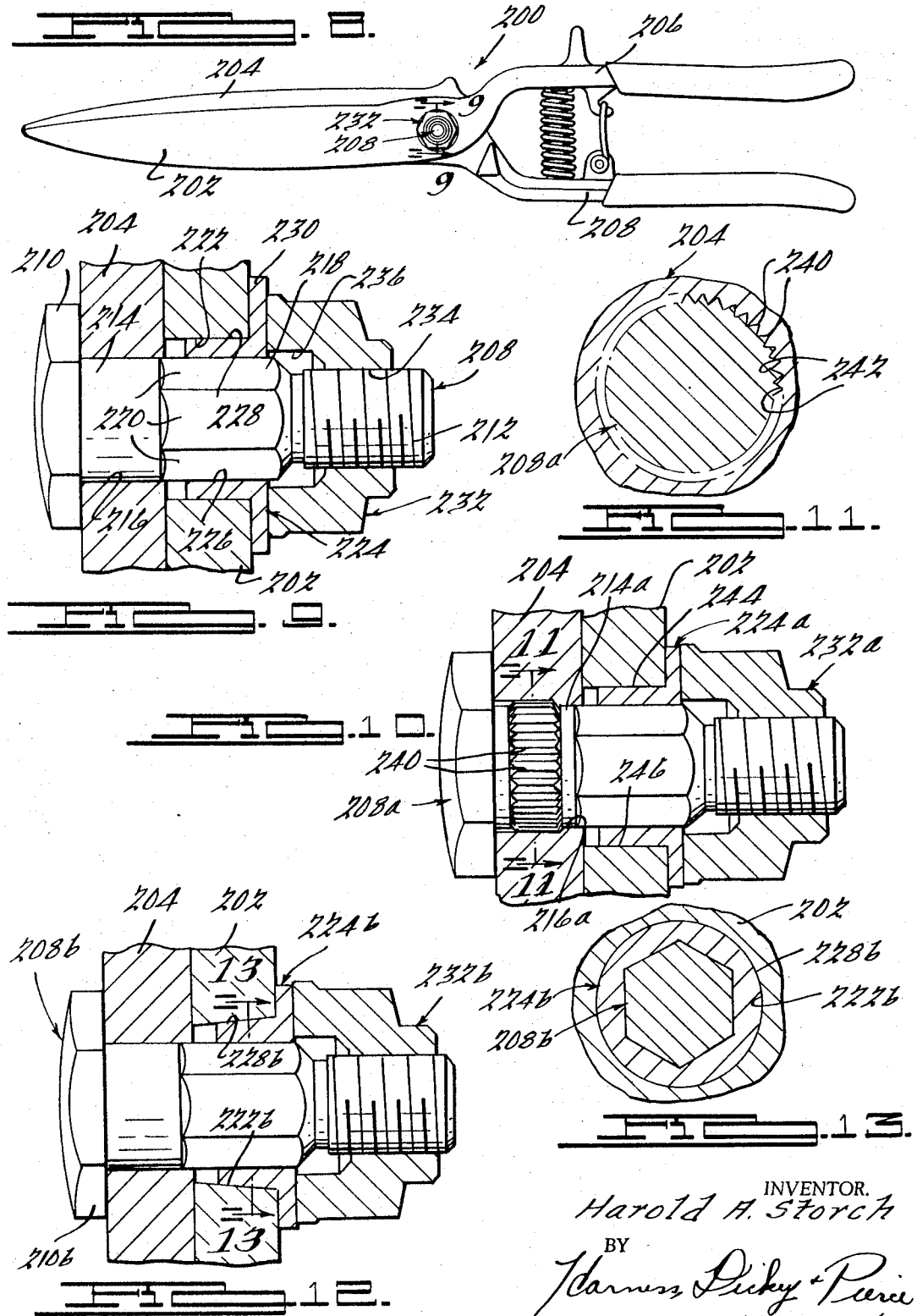

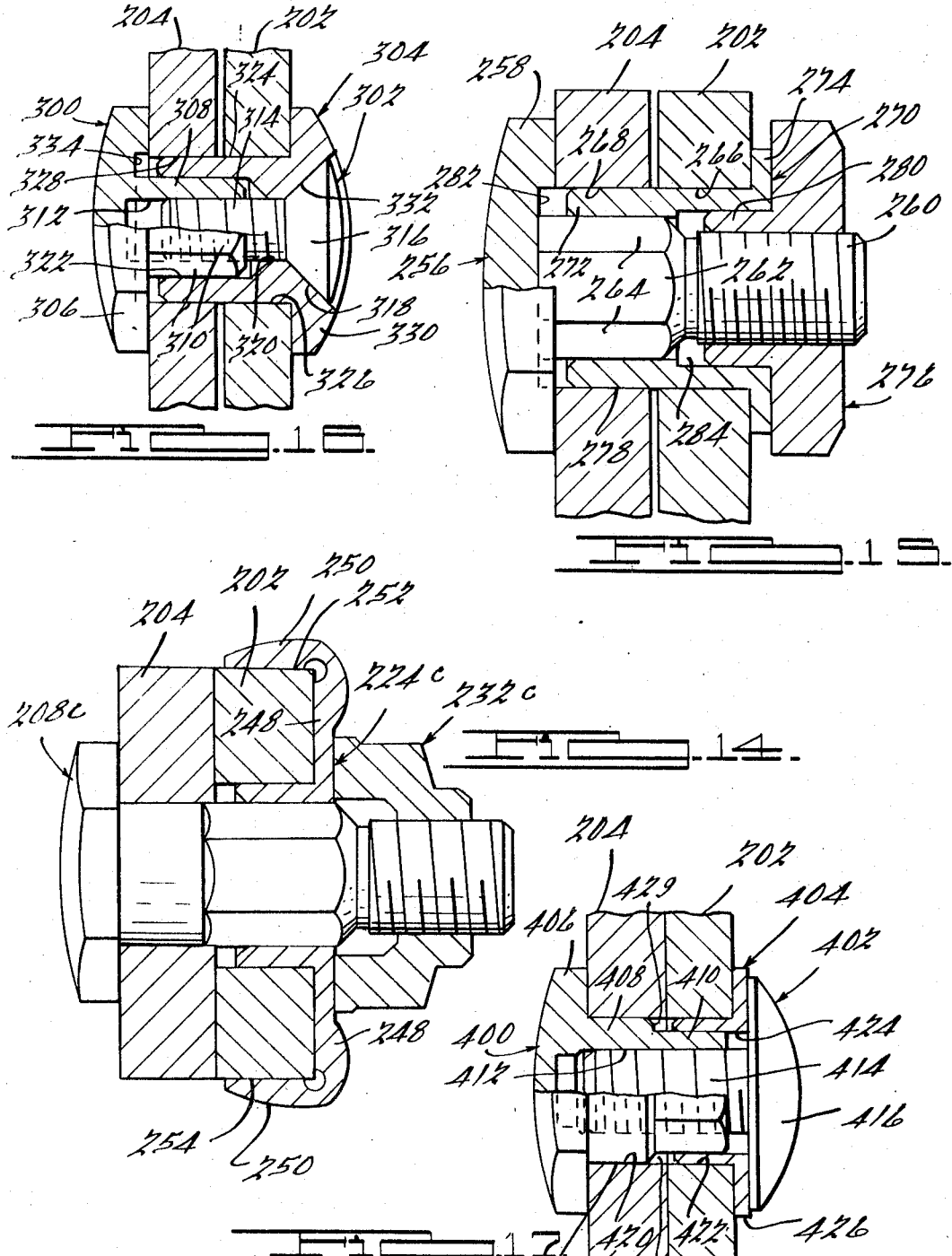

United States Patent Office 3,355,200
Patented Nov. 28, 1967

3,355,200
FASTENER ASSEMBLY FOR ANGULAR JOINT
Harold A. Storch, Birmingham, Mich., assignor to Federal Screw Works, Detroit, Mich., a corporation of Michigan
Filed Nov. 15, 1965, Ser. No. 507,742
4 Claims. (Cl. 287—101)

This application is a continuation-in-part of application, Ser. No. 351,119, filed Mar. 11, 1964, now abandoned.

This invention relates to angular joints and particularly to joints of the type in which two members are connected together by a bolt and nut for relative angular movement about the bolt axis.

The present invention is characterized by the provision of a bearing or bushing assembly which serves to both mechanically insulate the nut of a bolt and nut assembly from rotational forces and to support one of two members connected by the assembly for smooth low friction angular movement with respect to the other of said members. The present invention will find particularly useful application in a wide variety of constructions wherein one of the members is secured for low load, low velocity rotation or angular movement relative to the other of the members.

An exemplary application of the angular joint construction of the present invention will be found in automobile convertible top assemblies wherein several members of the frame are supported for pivotal movement relative to each other by a plurality of angular joints, thereby rendering the top collapsible. In particular, the main frame arms of the convertible top, which serve as the actuating mechanism for effecting raising and lowering thereof, are pivotably connected to the cross bows which extend transversely of the top and support the fabric top enclosure. For obvious reasons, it is desirable that the aforesaid joints function in a noiseless and relatively effortless manner. Also, it is highly desirably that the joints do not expose the occupants of the vehicle to grease or other types of lubricants. The present invention responds to this requirement through the provision of bearings or bushings which are constructed of nylon or other non-metallic materials that are characterized by low coefficient of friction and thus eliminate the need for periodic lubrication.

Accordingly, it is an object of the present invention to provide angular joints of the above character operable to connect two members for relative angular movement in a clean, efficient noiseless and smoothly operating manner.

It is another object of the present invention to provide a joint construction of the above character which provides for wear take-up in the event wear occurs between the two relatively rotatable members.

It is another object of the present invention to provide a joint of the above character which utilizes a nut and a bolt, or the like, which nut is isolated from any rotational or oscillatory or rotary forces produced upon relative movement of the members.

It is still another object of the present invention to provide a joint assembly of the above character wherein the nut may be threaded on the bolt to reduce any degree of axial force on the assembled members without the use of a cotter key or similar type locking device to fixedly secure the nut at a preselected position on the associated bolt.

It is a further object of the present invention to provide a joint construction of the above type which is of a durable construction, is reliable in operation and provides for ease of disassembly and requires negligible maintenance.

Other objects and advantages of the present invention will become apparent from the following detailed description, taken in conjunction with the accompanying drawings, wherein:

FIGURE 1 is a longitudinal cross-sectional view of an angular joint embodying the principles of the present invention;

FIGURE 2 is a cross-sectional view of the structure illustrated in FIGURE 1, as taken along the line 2—2 thereof;

FIGURE 3 is a cross-sectional view of the structure illustrated in FIGURE 1, as taken along the line 3—3 thereof;

FIGURE 4 is a view similar to FIGURE 1, of another embodiment of the present invention;

FIGURE 5 is a cross-sectional view of the structure illustrated in FIGURE 4, as taken along the line 5—5 thereof;

FIGURE 6 is a view similar to FIGURES 1 and 4 of another embodiment of the present invention;

FIGURE 7 is a cross-sectional view of the structure illustrated in FIGURE 6, as taken along the line 7—7 thereof;

FIGURE 8 is a side elevational view of a pair of scissor-type clippers or shears incorporating still another embodiment of the joint of the present invention therein;

FIGURE 9 is a cross-sectional view of a joint illustrated in FIGURE 8, as taken along the line 9—9 thereof;

FIGURE 10 is a cross-sectional view of still another embodiment of the joint of the present invention;

FIGURE 11 is a transverse cross-sectional view taken along the line 11—11 of FIGURE 10;

FIGURE 12 is a cross-sectional view of yet another embodiment of the present invention;

FIGURE 13 is a transverse cross-sectional view taken along the line 13—13 of FIGURE 12;

FIGURE 14 is a cross-sectional view of yet another embodiment of the joint of the present invention;

FIGURE 15 is a cross-sectional view of still another embodiment of the joint of the present invention;

FIGURE 16 is a cross-sectional view of still a further embodiment of the joint of the present invention;

FIGURE 17 is a cross-sectional view of still another embodiment of the joint of the present invention;

FIGURE 18 is a side elevational view of another embodiment of the joint of the present invention;

FIGURE 19 is a cross-sectional view of the embodiment of the present invention illustrated in FIGURE 18;

FIGURE 20 is a cross-sectional view taken along the line 20—20 of FIGURE 19;

FIGURE 21 is a cross-sectional view of still another embodiment of the joint of the present invention; and FIGURE 22 is a transverse cross-sectional view taken along the line 22—22 of FIGURE 21.

Referring now to FIGURES 1 through 3 of the drawings, a pivoting arm or frame member 1 and the fixed supporting member 2 are connected by a bolt 4 in a manner providing for relative angular movement therebetween about the axis of the bolt 4. The bolt 4 is fabricated with a cylindrical shank portion 8 formed adjacent a head portion 12 at one end thereof. The shank portion 8 lies within a cylindrical aperture 10 formed in the member 1, a pair of abutting bearing bushings 14 and 16 being interposed between the outer periphery of the shank portion 8 and the inner periphery of the opening 10.

The bushing 14 is formed with a bore 16 and the bushing 15 is formed with a similar bore 17, both of which bores mate with the surface of the cylindrical shank portion 8 in a manner such that the bushings 14 and 15 pivotably support the frame member 1 on the bolt 4. The bushings 14, 15 are preferably constructed of nylon or a similar type bearing material characterized by a low coefficient of friction. The bushings 14, 15 are formed with radial flanges 26, 28 which provide suitable bearings between the head portion 12 of the bolt 4 and the rotating member 1, and between the rotating member 1 and the fixed member 2, respectively. The bushings 14, 15 are also formed with axially extending portions 30, 32, respectively, which coact to form bearings between the rotating member 1 and the cylindrical shaped portion 8 of the bolt 4.

The bolt 4 is formed with a shoulder portion 34 that defines a plurality of axially extending faces 36 which are arranged such that the shoulder portion 34 is noncircular in transverse cross-section, and more particularly is of a generally hexagonal shape in cross-section, as illustrated in FIGURE 2. The shoulder portion 34 is located radially inwardly from the shank portion 8 and is adapted to be nonrotatably supported by the fixed supporting member 2 by being inserted through a bore 33 in the member 2. As best seen in FIGURE 2, the bore 33 is of a generally hexagonal conformation, but may take a variety of other noncircular shapes which are matable or complementary to the contour of the shoulder portion 34. A lock bushing 38 having an axially extending portion 40 is axially slidable, but nonrotatably, interposed between the outer periphery of the shoulder portion 34 and the inner periphery of the bore 33, the outer periphery 42 of the bushing 38 being of a complementary shape with respect to the inner periphery of the bore 33, i.e., is hexagonal in shape. Thus, the outer periphery 42 of the lock bushing 38 is adapted to matingly engage the bore 33, the lock bushing 38 defining a central bore 44 which is also hexagonal in shape and is adapted to matingly engage the outer periphery of the shoulder portion 34.

It will be seen from the above that the fixed member 2 is effectively keyed to the shoulder portion 34 of the bolt 4 by the coaction of the outer periphery thereof with the bore 44 of the lock bushing 38 and the outer periphery 42 of the lock bushing 38 with the inner periphery of the bore 33 of the support member 2. It is to be noted that the portion of the lock bushing 38 adjacent the cylindrical portion 8 of the bolt 4 is spaced therefrom, as will hereinafter be described.

The lock bushing 38 is formed with a radially outwardly extending flange portion 46 which is urged into abutting relation with the right side of the fixed support member 2 by a radially outwardly projecting flange portion 48 formed on the left end of the nut 50, as best seen in FIGURE 1. The nut 50 is threadably mounted on an externally threaded end portion 56 of the bolt 4, the end portion 56 being spaced radially inwardly from the shoulder portion 34 of the bolt 4. Thus, as the nut 50 is advanced on the threaded portion 56, the lock bushing 38 is urged into abutting engagement with the fixed support member 2 and provides for adjustment and selective tightening of the assembly.

It will be seen from the above description that the frame member 1 is pivotably supported by the greaseless, noiseless bearing bushings 14, 15 in a manner so as to provide for free pivotal movement of the frame member 1 relative to the fixed member 2. It will also be seen that the fixed member 2 is rigidly held, both axially and angularly, relative to the total assembly and is provided with bearing material between the side thereof confronting the pivotable frame member 1 to assure for relatively noise free and frictionless operation. Also, it will be noted that rotational movement of the pivotal frame member 1 is positively isolated from the nut 50 by means of the lock bushing 58. Accordingly, the normal problems of loose or lost nuts encountered in the connection of two relatively rotatable members is minimized to the extreme.

Assembly of the above described joint is accomplished by initially inserting the bearing bushings 14 and 15 in the bore 10 of the frame member 1 from the opposite sides thereof. The bolt 4 is then inserted into the bores 16, 17 of the bushings 14, 15 until the shank portion 8 is disposed therein with the threaded portion 56 extending in the direction of the fixed supporting member 2. The bore 33 of the fixed supporting member 2 is then inserted over the shoulder portion 34 and the lock bushing 38 is inserted into the annular space between the outer periphery of the bolt 4 and the inner periphery of the bore 33. The nut 50 is then threaded onto the end portion 56 of the bolt 4 and is tightened to a desired degree to insure little or no axial movement between the various component members above described.

Referring now to FIGURES 4 and 7, a slightly modified construction of the joint of the present invention is shown in operative association with a pivotable frame member 57 that is supported for angular movement relative to a fixed support member 59 by means of a bolt member 61. The bolt 61 is fabricated with a cylindrical shank portion 63 adjacent a head portion 65 thereof. The shank portion 63 extends through a cylindrical bore 69 in the frame member 57, the outer periphery of the shank portion 63 being spaced radially inwardly from the inner periphery of the bore 69. A second cylindrical shank portion 71 is formed on a medial portion of the bolt 61, which portion 71 is placed radially inwardly from the portion 63 and cooperates therewith to support a pair of nylon bearing bushings 75 and 77.

The bushing 75 is interposed between the inner periphery of the bore 69 and the shank portion 63 of the bolt 61, which bushing 75 is formed with a radially outwardly extending portion 79 and defines a central bore 81 which is matingly received on the outer periphery of the shank portion 63. The bushing 77 is also formed with a radially outwardly projecting portion 83 and defines a cylindrical bore 85 and is adapted to be slidably received on the shank portion 71. The bearing bushing 77 is axially spaced from the bearing bushing 75 by means of an intermediate bushing 87 having a reduced thickness section 88 at one end which is interposed between the outer periphery of the bushing portion 79 and the inner periphery of the bore 69. The end portion 88 abuts against a radially outwardly projecting flange portion 88 formed on the bushing 75, the opposite end 90 of the bushing 87 abutting against a radially outwardly projecting flange portion 91 formed on the bushing 77. Thus, the end of the bushing 77 adjacent the shank portion 63 is confined to the shank portion 71 to assure proper movement of the bushing 77 in the direction of the head 65. Bushing 87 is preferably formed of metal or the like and includes a shoulder portion 93 which is adapted to engage the right side of the frame member 57 and thus retain the frame member 57 and fixed support member 59 in proper axial alignment. It is to be noted that the metal-to-metal contact of the shoulder 93 and side of the frame member 57 is such as to enable both the members 93 and 57 to pivot as a unit. Thus, the radial flanges 88, 91 also serve to provide a suitable bearing between the head 65 and frame member 57, and between bushing 87 and fixed support member 59.

The bolt 61 is formed with a shoulder portion 95 which is spaced radially inwardly from the shank portion 71 in a manner similar to the shoulder portion 34 illustrated in FIGURE 1, that is, the shoulder portion 95 is formed with a plurality of axially extending face portions 97 which are adapted to slidingly and matingly engage the bore 44 or similar noncircular aperture formed in the lock bushing 38. Also, the outer periphery 42 of the bushing 38 is slidably and matably insertable within a bore 99 formed in the fixed support member 59, thereby slidably but nonrotatably keying the fixed member 59 to the shoulder portion 95.

In the operation of the pivot member, bushing 77 may rotate relative to the lock bushing 38, a recessed portion 101 being provided adjacent the confronting end of the bushing member 77 and the inner periphery of the bushing 83 and a minimum clearance is provided between the outer peripheral surface 42 and the recessed portion 41 to avoid engagement between the bushings 38 and 77. The recessed portion 101 defines a shoulder 102 to provide clearance between the lock bushing 38 and the bushing 77. As illustrated in FIGURE 1, the nut 50 is threadably received on a threaded portion 107 formed at one end of the bolt 61, the nut 50 having a flange portion 48 adapted to engage the flange 46 of the lock bushing 38. As the nut 50 is advanced on the threaded portion 107, the lock bushing 38 is axially urged toward the head 65, thus axially positioning the various elements of a joint. It is to be noted that the rotational movement of the various elements is effectively isolated from the nut 50 by means of the lock bushing 38. Also, in contemplation of providing a greaseless, noiseless joint, each of the metallic elements is effectively isolated from other elements by means of the nylon bearings.

In assembling the above described joint, the bearing bushing 79 is inserted on the shank portion 65 with the flange 88 in engagement with the head 65. The bolt 69 is positioned concentrically of the bolt 63 and bushing 37 is inserted in the annular space between the bushing 79 and bore 69. The bushing 77 is inserted between bushing 87 and the shank portion 71 and flange 91 is urged into engagement with bushing 87. The bore 99 is axially aligned with bore 85 and lock bushing 38 is inserted between the bore 99 and the shoulder portion 95 with the flange 46 in engagement with the fixed member 59. The nut 50 is advanced on the threaded portion 107 and is tightened the desired degree until the members of the joint are properly positioned relative to the bolt 61.

Referring now to FIGURES 6 and 7, another embodiment of the present invention is illustrated wherein a frame member 113 and a pivotable member 115 are mounted for relative rotation upon a bolt 6. Bolt 6 is identical to that shown in FIGURE 1; however, the frame member 113 is formed with a bore 117 which is received directly on the cylindrical shank portion 8 and in direct contact with the head 12. This metal-to-metal contact between the frame member 113 and bolt 6 effectively precludes relative rotation therebetween. A bearing washer 119 is partially supported upon the shank portion 8 and is disposed between the frame member 113 and pivotable member 115 to provide spacer means therebetween.

A lock bushing 125 is slidably, but nonrotatably supported upon shoulder portion 34, the lock bushing 25 having a hexagonal bore 127 which is matably engageable with shoulders 36. The lock bushing 25 is formed with a cylindrical outer periphery 129 which mates with a cylindrical bore 131 formed in the pivotable member 115. Accordingly, a low friction surface 129 is provided to permit relatively free angular movement of the pivotable member 115 relative to the bolt 6. The lock bushing 125 is formed with a flange 135 which is adapted to be engaged by the flange 48 formed on the bolt 50. Thus, as the nut 50 is advanced upon the threaded portion 56, the flange 135 is axially urged into engagement with the side of the pivotable member 115 to axially position the various members of the joint. Again, it is to be noted that rotational movement in the joint assembly is isolated from the nut 50 by the lock bushing 125, as in the above described embodiments. Assembly of a structure illustrated in FIGURES 6 and 7 is accomplished in a manner similar to that of FIGURE 1 and needs no further explanation. The nut 50 is sufficiently tightened to position the various members and to urge the frame member 113 into engagement with the head 12.

Referring now to FIGURES 8 and 9, another modified construction of the angular joint of the present invention is shown in operative association with a pair of scissor-type shears 200 comprising a pair of shearing blade members 202 and 204 which are provided with integral handle sections 206 and 208, respectively. The members 202 and 204 are pivotably connected to one another by means of the aforesaid modified joint construction which, as best seen in FIGURE 9, comprises a bolt or stud member 208 having a head portion 210 at one end thereof and an externally threaded portion 212 at the opposite end thereof. The bolt 208 is formed with a cylindrical shank section 214 adjacent the right side of the head section 210, which section 214 is rotatably disposed within an annular bore 216 formed in the blade member 204. The bolt 208 is formed with a locking shoulder section 218 interjacent the shank portion 214 and threaded portion 212, the section 218 defining a plurality of axially extending face portion 220 which result in the section 218 being generally hexagonal shaped in transverse cross-section. The locking section 218 extends axially through and is spaced radially inwardly from the periphery of a hexagonally shaped bore 222 that is formed in the member 202. Interposed between the periphery of the bore 222 and the outer periphery of the section 218 is a block bushing member 224 that defines a hexagonally shaped bore 226 which is complementary to and matingly engages the outer periphery of the bolt section 218. The outer periphery of the bushing 224 defines a hexagonal shaped outer surface 228 which is complementary to and matingly engages the periphery of the bore 222 in the blade member 202, whereby the member 202 and bolt 208 are locked together to prevent any relative rotational movement therebetween in a manner identical to the way the bolt 4 and member 2 are secured in FIGURE 1.

The lock bushing 224 is formed with a radially outwardly extending annular flange portion 230 which is urged into abutting relation with the right side of the blade member 202 by a nut 232, as best seen in FIGURE 9. The nut 232 is formed with an internally threaded bore 234 which is threadably received on the end portion 212 of the bolt 208. The nut 232 is also formed within a counterbore 236 which is sufficiently large in diameter to receive the locking section 218 of the bolt 208 when the nut 232 is advanced axially along the bolt 208. It will be noted that the axial length of the lock bushing 224 is such that the left end thereof does not engage the right side of the blade member 204 so that at such time as any appreciable wear occurs between the interengaging surfaces of the blade members 202 and 204, the nut 232 may be further tightened on the bolt 208 without any interference occurring between the left end of the bushing 224 and the right side of the blade member 204.

As in the hereinbefore described embodiments of the joint construction of the present invention, the lock bushing 224 is preferably constructed of nylon or similar low coefficient of friction material which provides for a noiseless, lubricant-free joint. Moreover, in certain applications, the nut 232 may be constructed of a plastic material whereby to reduce the structure weight of the joint and minimize manufacturing cost thereof.

Referring now to FIGURES 10 through 14, there is shown three slightly modified embodiments of the joint construction illustrated in FIGURE 9. FIGURE 10 illustrates a pair of relatively rotatable members, for example, the blade members 202 and 204, which are pivotably connected by means of a bolt 208a, nut 232a and lock bushing 224a, all of which members are identical to the components designated by like numerals in FIGURE 9, with the exception that the cylindrical shank portion 214a of the bolt 208a is formed with a plurality of circumferentially spaced radially outwardly projecting serrated teeth 240, as best seen in FIGURE 11. The teeth 240 are adapted to matingly engage a plurality of circumferentially spaced and complementary shaped grooves 242 formed around the periphery of the bore 216a of the member 204, whereby to lockingly secure the member 204 and bolt 208a against relative rotational movement. One other difference between the joint construction illustrated in FIGURE 10 from that shown in FIGURE 9 resides in the fact that the outer periphery of the lock bushing 224a is formed with a cylindrical surface 244 instead of the hexagonal surface 228 above described. The surface 224 is complementary to and adapted to rotatably engage a cylindrical bore 246 formed in the blade member 202, whereby the member 202 will be rotatably or pivotably supported upon the bolt 208a and hence relative to the blade member 204.

The joint construction illustrated in FIGURES 12 and 13 for connecting two relatively rotatable members such as the blade members 204 and 202 is also very similar to that shown in FIGURE 9 and comprises a bolt 208b, lock bushing 224b and nut 232b, all of which members are substantially identical to the members designated by like numerals in FIGURE 9, with the exception that the outer periphery 228b of the lock bushing 224b is frusto-conical in shape and tapered radially inwardly toward the head section 210b of the bolt 208b, which tapered surface is adapted to matingly engage the periphery of the bore 222b of the member 202 which is also frusto-conical in shape and tapered in a manner so as to be complementary to the conformation of the outer periphery of the lock bushing 224b. With this construction, it will be seen that as the nut 232b is advanced axially of the bolt 208b, the surfaces 228b and 222b will be engaged for relative rotational movement, but against relative axial movement.

The joint construction illustrated in FIGURE 14 is also similar to the construction shown in FIGURE 9 and is adapted to pivotably connect two relatively movable members, for example, the blade members 202 and 204, which joint construction comprises a bolt 208c, nut 232c and lock bushing 224c, all of which members are substantially identical to the members of the joint construction designated by like numerals in FIGURE 9, with the exception that the lock bushing 224c is formed with a pair of diametrically opposed, radially outwardly extending retaining ears, generally designated 248. The ears 248 are formed with axially extending retaining sections 250 which are bent or similarly deformed in a direction parallel to the axis of the bolt 208c and tightly engage the upper and lower surfaces 252 and 254 of the blade member 202. With this construction, relative rotational movement between the lock bushing 224c and the member 202 is positively prevented.

It may be noted that in each of the joint constructions illustrated in FIGURES 10, 12 and 14, an annular space is provided between the left ends of the lock bushings and the right side of the members 204, whereby to provide for axial adjustment of the lock bushings 224 upon suitable axial adjustment of the nuts 232, as described in connection with the joint construction illustrated in FIGURE 9.

Referring now to FIGURE 15, another slightly modified form of the joint construction of the present invention is shown in operative association with a pair of relatively rotatable members, for example, the blade members 204 and 202, and comprises a bolt 256 having an enlarged diameter head section 258 at one end thereof and an externally threaded section 260 at the opposite end thereof. The bolt 256 is also formed with a locking section 262 interjacent the sections 258 and 260 thereof, which section 262 defines a plurality of axially extending face portions 264, resulting in the section 262 being generally hexagonal in shape in transverse cross section. Interposed between the outer periphery of the bolt sections 260 and 262 and the inner periphery of a pair of axially aligned cylindrical bores 266 and 268 formed in the members 202 and 204 is a lock bushing, generally designated 270. The lock bushing 270 is formed with an enlarged thickness portion 272 at the left end thereof and with a radially outwardly projecting flange section 274 at the opposite end thereof, the latter of which is urged into abutting engagement with the right side of the member 202 by a nut 276 that is threadably mounted on the section 260 of the bolt 256. The outer periphery of the bushing 270 is formed with a smooth cylindrical surface 278 which rotatably engages the periphery of the bores 266 and 268 in the members 202 and 204, respectively, for the support of the members 202 and 204 on the bolt 256. The inner periphery of the portion 272 of the bushing 270 is hexagonal in shape and adapted to matingly engage the locking section 262 of the bolt 256, whereby relative rotational movement between the bushing 270 and bolt 256 is positively prevented. The right end of the bushing 270 bears upon the outer periphery of an axially extending annular flange portion 280 that is formed on the left side of the nut 276. An annular recess 282 is formed in the right side of the bolt head section 258 circumjacent the locking section 262, which recess 282 is adapted to provide for axial movement of the left end of the lock bushing 270 toward the head section 258 upon axial advancement of the nut 276 relative to the bolt 256. The recess 282, together with an annular recess 284 interjacent the left end of the nut flange section 280 and the locking section 262 of the bolt 256, provides for the aforedescribed axial advancement or tightening of the nut 276 at such time as any wear occurs between the members 202 and 204.

Referring now to FIGURE 16, the members 202 and 204 or the like are connected together for relative movement by means of another embodiment of the angular joint construction of the present invention which comprises a female fastening member 300, a male fastening member 302 and lock bushing 304. The member 300 comprises an enlarged diameter head section 306 and an axially extending cylindrical locking section 308, the latter of which is formed with a plurality of axially extending face portions 310 and is generally hexagonal in transverse cross-section. The locking section 308 is formed with a central axially extending bore 312 which is internally threaded and is thereby adapted to threadably receive an externally threaded shank portion 314 of the male fastening member 302 which, as illustrated in FIGURE 16, is generally in the form of an oval headed machine screw having a tapered head section 316 that defines a frusto-conical surface 318.

The lock bushing 304 is formed with a central axially extending bore 320, the left end portion 322 of which is hexagonal in cross section and matingly engageable with the outer periphery of the locking section 308 of the member 300. The outer periphery of the left end of the bushing 304 defines a cylindrical surface 324 which is adapted to be rotatably engageable with bores 326 and 328 formed in the members 202 and 204, respectively. The lock bushing 304 is also formed with a radially outwardly extending shoulder portion 330 which is substantially of the same diameter as the head section 306 of the fastening member 300. The right end of the bore 322 is countersunk as seen at 332 and is thereby adapted to matingly engage the frusto-conical surface 318 on the head section 316 of the fastening member 302 upon assembly of the joint in the manner illustrated in FIGURE 16. It will be seen that as the fastener member 302 is advanced axially within the bore 312 of the member 300, the lock bushing 304 will be urged axially toward the head section 306 of the fastener member 300, whereby to urge the relatively rotatable members 202 and 204 into engagement with one another. It will also be noted that since the lock bushing 304 is positively prevented from rotating relative to the fastener member 300 through the provision of the matingly engageable hexagonal surfaces 310 and the bore 322, any rotational movement of the member 204 will be insulated from the fastener member 304 to prevent the member 304 from becoming loosened relative to the member 300. An annular recess 334 is formed in the head section 306 of the fastener member 300 circumjacent the locking section 308 thereof, which recess 334 is adapted to receive the left end of the lock bushing 304 upon preselected tightening of the members 300 and 302 relative to one another to accommodate for wear take-up after extended relative rotational movement between the members 202 and 204.

Referring now to FIGURE 17, the members 202 and 204 are connected for relatve rotational movement by means of still another embodiment of the angular joint construction of the present invention which comprises a female fastener member 400, a male fastener member 402 and lock bushing 404. The fastener member 400 comprises an enlarged diameter head section 406, a cylindrical shank section 408 and a hexagonal cross section locking portion 410. The member 400 is also formed with a central axially extending internally threaded bore 412 which is adapted to threadably receive an externally threaded fastener section 414 of the member 402 which, as illustrated in FIGURE 17, includes an enlarged diameter head section 416.

The shank section 408 of the fastener member 400 defines a cylindrical outer surface 418 which is adapted to rotatably engage a cylindrical bore 420 formed in the member 204. The lock bushing 404 is adapted to be interposed between the outer periphery of the locking portion 410 and a bore 422 in the member 202 and support the latter for rotational movement relative to the bushing 404 and the fastener members 400 and 402. The inner periphery of the bushing 404 defines a generally hexagonal shaped inner surface 424 which is matingly engageable with the outer periphery of the locking portion 410 whereby to positively prevent any relative rotational movement between the fastener member 400 and the bushing 404. The bushing 404 is also formed with a radially outwardly projecting flange portion 426 at its right end which is urged into abutting engagement with the right side of the member 202 upon tightening of the fastener member 402 relative to the member 404. As in the hereinabove described embodiments of the present invention, an annular space 428 is provided between the left end of the lock bushing 404 and the radially extending shoulder 429 formed at the juncture of the section 404 and portion 410 of the fastener member 400 to provide for take-up after any appreciable amount of wear occurs between the interengaging surfaces of the members 202 and 204.

Referring now to FIGURES 18 through 20, the members 202 and 204 are connected for relative rotational movement by means of yet another embodiment of the angular joint construction of the present invention which comprises a female fastener member 500, a male fastener member 502 and lock bushing 504. The member 500 is formed with an enlarged diameter head section 506 and an elongated cylindrical shank section 508, the latter of which is rotatably engageable with a pair of axially aligned cylindrical bores 510 and 512 formed in the members 202 and 204, respectively. The shank section 508 of the fastener member 500 is formed with a central axially extending internally threaded bore 514 which is adapted to threadably receive an externally threaded shank section 516 of the fastener member 502 which is also formed within a large diameter head section 518 and is substantially identical in structure to the aforedescribed fastener member 402.

The lock bushing 504 is substantially identical in construction with the bushing 404 described in connection with the joint illustrated in FIGURE 17, with the exception that the bushing 504 is formed with three generally rectangular shaped circumferentially shaped and axially extending recesses, generally designated by the numeral 520 and one of which is illustrated in FIGURE 18. Each of the recesses 520 is adapted to slidably receive one of three axially extending locking tab portions 522 that are formed on the fastener 500 and are complementary in shape with respect to the recesses 520, as illustrated in FIGURES 18 and 20. It will be seen that when the tab portions 522 are slidably inserted within the recesses 520, relative rotational movement between the lock bushing 502 and fastener member 500 is effectively precluded, hence, any rotational movement of the member 202 will be insulated from the fastener member 502 to prevent loosening of the member 502 relative to the member 500.

It will also be seen that the recesses 520 are somewhat longer in axial directions than the axial lengths of the locking tabs 522 so that the lock bushing 504 may be moved axially toward the head section 506 of the fastener member 500 to provide for wear take-up, as hereinabove described.

Referring now to FIGURES 21 and 22, a pair of relatively rotatable members such as the members 202 and 204 are supported for rotational movement relative to one another by means of still another embodiment of the angular joint construction of the present invention which comprises a female fastener member 600, lock bushing 602 and male fastener 604, the latter of which is identical in construction to the aforedescribed fastener members 502 and 402. The fastener member 600 includes an enlarged diameter head section 606 and an axially extending shank section 608, the left end of which defines an outer cylindrical surface 610 which is rotatably engageable with a cylindrical bore 612 formed in the member 204. Another cylindrical bore 614 is formed in the member 202 and is identical in size to the bore 612 and is axially aligned therewith. The shank section 608 is formed with an axially extending internally threaded central bore 616 which is adapted to threadably receive an externally threaded shank section 618 of the fastener member 604.

The right end of the fastener member 600 is formed with a pair of diametrically opposed recessed sections 620 and 622, each of which extends approximately 90 degrees about the axis of the fastener assembly. The lock bushing 602 is interposed between the periphery of the bore 614 and the section 618 of the fastener member 604, the bushing 602 being formed with a pair of axially extending locking tab portions 624 and 626 which are complementary in shape with respect to the recessed sections 620 and 622 formed in the fastener member 600 and are adapted to be slidably received therein upon assembly of the joint construction. It will be seen that with the tab sections 624 and 626 slidably inserted within the recessed portions 620 and 622, relative rotational movement between the fastener member 600 and lock bushing 602 is effectively precluded, whereby to isolate any rotational movement of the member 204 from the fastener member 604 and thereby prevent loosening of the member 604 relative to the member 600. It will be noted that the lengths of the tab sections 624 and 626 are somewhat less than the axial lengths of the recessed sections 620 and 622 to permit the lock bushing 602 to be moved axially toward the fastener member 600 to accommodate for wear take-up.

In each of the embodiments shown in FIGURES 9 through 22, the lock bushings are perfectly constructed of nylon or a similar low coefficient friction material so that the various angular joint constructions do not require periodic lubrication, as above described. Also, although the various matingly engageable surfaces of the fastener members and the lock bushings have been described herein as being generally hexagonal in shape, it will be readily apparent that such surfaces may be of virtually any polygonal configuration, i.e., pentagonal, rectangular, octagonal and the like.

While it will be apparent that the exemplary embodiments herein illustrated are well calculated to fulfill the objects above stated, it will be appreciated that the invention is susceptible to modification, variation and change without departing from the proper scope or fair meaning of the subjoined claims.

What is claimed is:

1. In a fastener assembly,
   a uniform diameter cylindrical shaft having a supporting portion adapted to support a first load member, a shoulder portion of noncircular cross section axially spaced from one end of said supporting portion, and a threaded portion formed at one end of said shaft adjacent said shoulder portion,
   locking bushing means for supporting a second load member and defining an aperture having a contour matable with the contour of said shoulder portion and being slidably carried thereon, whereby said lock bushing means is non-rotatably secured on said shaft, said bushing means having a uniform diameter outer periphery and defining a radially outwardly extending flange portion at one end thereof, a spacer member rotatably mounted on said supporting portion and having radially outwardly extending face portions engageable witht he confronting sides of said load members for maintaining a predetermined spacing between said load members, and a nut threaded on said threaded portion and adapted to urge said lock bushing means longitudinally as said nut is advanced on the shaft, said lock bushing means having one end thereof axially spaced from one of said load members to provide for wear take-up when wear occurs between said load members.

2. The invention as set forth in claim 1 wherein said shaft includes a cylindrical shank portion and wherein said assembly comprises a first bearing bushing rotatably carried on said cylindrical portion and a second bearing bushing rotatably supported on said first bushing and adapted to form a bearing race for supporting said first load member.

3. The invention as set forth in claim 1 wherein said shaft is formed with first and second cylindrical portions, said first portion being slightly larger in diameter than said second portion, and wherein said assembly includes means forming a bearing race carried on said cylindrical portions, said last mentioned means comprising first and second bearing bushings rotatably mounted on said first and second cylindrical portions and at least one other bushing rotatably mounted on said first and second bushings and adapted to rotatably support one of the load members.

4. The invention as set forth in claim 3 wherein said first bearing bushing is supported on said first cylindrical portions and adapted to support the first load member, wherein said second bearing bushing is supported on said second cylindrical portion, and which includes bushing means interposed between said first bearing bushing and the first load member and partially carried on said second bearing bushing for axially spacing said first and said second bearing bushings.

References Cited
UNITED STATES PATENTS

| | | | |
|---|---|---|---|
| 624,175 | 5/1899 | Chapman | 30—266 |
| 1,079,997 | 12/1913 | Wernimont | 30—266 |
| 2,487,329 | 11/1949 | Gerry | 287—96 |
| 2,509,285 | 5/1950 | Bendicsen | 287—96 |
| 2,582,184 | 1/1952 | Wheeler | 30—266 |
| 2,741,844 | 4/1956 | Sejman et al. | 151—41.5 |
| 2,919,942 | 1/1960 | Bechtel | 287—96 |
| 3,072,448 | 1/1963 | Melton et al. | 287—93 |
| 3,124,370 | 3/1964 | Traugott | 287—92 |
| 3,198,563 | 8/1965 | Steidl | 151—39 |

EDWARD C. ALLEN, *Primary Examiner.*

M. PARSONS, JR., CARL W. TOMLIN,
*Assistant Examiners.*